US011281561B2

(12) United States Patent
Ramraz et al.

(10) Patent No.: US 11,281,561 B2
(45) Date of Patent: Mar. 22, 2022

(54) DETERMINING USER BEHAVIOR WITH A USER INTERFACE USING USER INTERFACE LOG RECORDS

(71) Applicant: Red Hat, Inc., Raleigh, NC (US)

(72) Inventors: Oded Ramraz, Westford, MA (US); Boaz Shuster, Raanana (IL)

(73) Assignee: Red Hat, Inc., Raleigh, NC (US)

( * ) Notice: Subject to any disclaimer, the term of this patent is extended or adjusted under 35 U.S.C. 154(b) by 143 days.

(21) Appl. No.: 16/564,477

(22) Filed: Sep. 9, 2019

(65) Prior Publication Data

US 2021/0073102 A1 Mar. 11, 2021

(51) Int. Cl.
G06F 11/34 (2006.01)
G06F 11/07 (2006.01)
G06F 11/32 (2006.01)

(52) U.S. Cl.
CPC ...... *G06F 11/3476* (2013.01); *G06F 11/0766* (2013.01); *G06F 11/323* (2013.01); *G06F 11/3438* (2013.01)

(58) Field of Classification Search
CPC ............. G06F 11/3636; G06F 11/3476; G06F 11/0778; G06F 11/3466; G06F 11/348; G06F 11/0751; G06F 2201/865; G06F 11/079; G06F 11/0709; G06F 11/3495; G06F 11/0706; G06F 11/0766; G06F 11/3438; G06F 11/323
See application file for complete search history.

(56) References Cited

U.S. PATENT DOCUMENTS

| 7,023,708 | B2 | 4/2006 | Nguyen et al. |
| 8,161,459 | B2 | 4/2012 | Gorthi et al. |
| 9,734,005 | B2 | 8/2017 | Ruan et al. |
| 10,366,096 | B2 * | 7/2019 | Ferrar ................. G06F 11/0775 |
| 10,656,979 | B2 * | 5/2020 | Ishakian ............. G06F 16/9024 |
| 10,896,253 | B2 * | 1/2021 | Liu ........................ G06F 21/577 |
| 2009/0228474 | A1 * | 9/2009 | Chiu .................... G06F 16/9024 |

(Continued)

FOREIGN PATENT DOCUMENTS

CN 107733863 A 2/2018

OTHER PUBLICATIONS

US 10,324,944 B2, 06/2019, Ferrar (withdrawn)

(Continued)

*Primary Examiner* — Amine Riad
(74) *Attorney, Agent, or Firm* — Withrow & Terranova, PLLC

(57) ABSTRACT

Determining user behavior using user interface log records. A plurality of log files, generated by an application in response to user interface inputs from a corresponding plurality of users accessing a user interface of the application to accomplish a task, is accessed. Each log file includes a plurality of log records that identify user interface inputs of the corresponding user to user input controls of the user interface. Each respective log file of the plurality of log files is analyzed to identify a path of a plurality of different potential paths taken by the corresponding user from a start user input control to an end user input control to accomplish the task. Information is stored that identifies a common path from the start user input control to the end user input control based on the path taken by the corresponding user for each log file and a common path criterion.

20 Claims, 8 Drawing Sheets

(56) References Cited

U.S. PATENT DOCUMENTS

| | | | |
|---|---|---|---|
| 2011/0179160 A1 | 7/2011 | Liu et al. | |
| 2017/0063911 A1* | 3/2017 | Muddu | H04L 63/1425 |
| 2017/0286190 A1* | 10/2017 | Ishakian | G06F 9/542 |
| 2017/0324759 A1* | 11/2017 | Puri | H04L 41/069 |
| 2018/0113783 A1 | 4/2018 | Luo et al. | |
| 2019/0361766 A1* | 11/2019 | Cardoso | G06F 11/323 |
| 2020/0021511 A1* | 1/2020 | Xu | G06F 16/1824 |
| 2020/0133823 A1* | 4/2020 | Kumar | G06F 11/079 |
| 2020/0167271 A1* | 5/2020 | Zhang | G06N 5/022 |

OTHER PUBLICATIONS

Author Unkown, "Create UI-based tests with automated scenario testing," PEGA Community, community.pega.com/knowledgebase/articles/create-ui-based-tests-automated-scenario-testing, Last updated Oct. 3, 2018, 3 pages.

Author Unknown, "Event reference," developer.mozilla.org/en-US/docs/Web/Events, Last updated Aug. 31, 2019, Mozilla, 39 pages.

Andrews, James, "Testing using Log File Analysis: Tools, Methods, and Issues," International Conference on Automated Software Engineering, Oct. 1998, IEEE, 10 pages.

Kacmarcik, Gary, et al., "UI Events," W3C Working Draft, May 30, 2019, 110 pages.

\* cited by examiner

DETERMINING USER BEHAVIOR WITH A USER INTERFACE USING USER INTERFACE LOG RECORDS

BACKGROUND

A user interface designer designs a user interface with particular user interactions in mind, but in practice, users may interact with the user interface quite differently than expected.

SUMMARY

The examples disclosed herein determine user behavior with a user interface (UI) using UI log records.

In one example a method is provided. The method includes accessing a plurality of log files generated by an application in response to user interface inputs from a corresponding plurality of users accessing a user interface of the application to accomplish a task, each log file comprising a plurality of log records that identify user interface inputs of the corresponding user to user input controls of the user interface. The method further includes analyzing, for each respective log file of the plurality of log files, the plurality of log records to identify a path of a plurality of different potential paths taken by the corresponding user from a start user input control to an end user input control to accomplish the task. The method further includes storing information that identifies a common path from the start user input control to the end user input control based on the path taken by the corresponding user for each log file and a common path criterion.

In another example a computing device is provided. The computing device includes a memory, and a processor device coupled to the memory. The processor device is to access a plurality of log files generated by an application in response to user interface inputs from a corresponding plurality of users accessing a user interface of the application to accomplish a task, each log file comprising a plurality of log records that identify user interface inputs of the corresponding user to user input controls of the user interface. The processor device is further to analyze, for each respective log file of the plurality of log files, the plurality of log records to identify a path of a plurality of different potential paths taken by the corresponding user from a start user input control to an end user input control to accomplish the task. The processor device is further to store information that identifies a common path from the start user input control to the end user input control based on the path taken by the corresponding user for each log file and a common path criterion.

In another example a computer program product stored on a non-transitory computer-readable storage medium is provided. The computer program product includes instructions to cause a processor device to access a plurality of log files generated by an application in response to user interface inputs from a corresponding plurality of users accessing a user interface of the application to accomplish a task, each log file comprising a plurality of log records that identify user interface inputs of the corresponding user to user input controls of the user interface. The instructions further cause the processor device to analyze, for each respective log file of the plurality of log files, the plurality of log records to identify a path of a plurality of different potential paths taken by the corresponding user from a start user input control to an end user input control to accomplish the task. The instructions further cause the processor device to store information that identifies a common path from the start user input control to the end user input control based on the path taken by the corresponding user for each log file and a common path criterion.

Individuals will appreciate the scope of the disclosure and realize additional aspects thereof after reading the following detailed description of the examples in association with the accompanying drawing figures.

BRIEF DESCRIPTION OF THE DRAWINGS

The accompanying drawing figures incorporated in and forming a part of this specification illustrate several aspects of the disclosure and, together with the description, serve to explain the principles of the disclosure.

DETAILED DESCRIPTION

Figure 1:
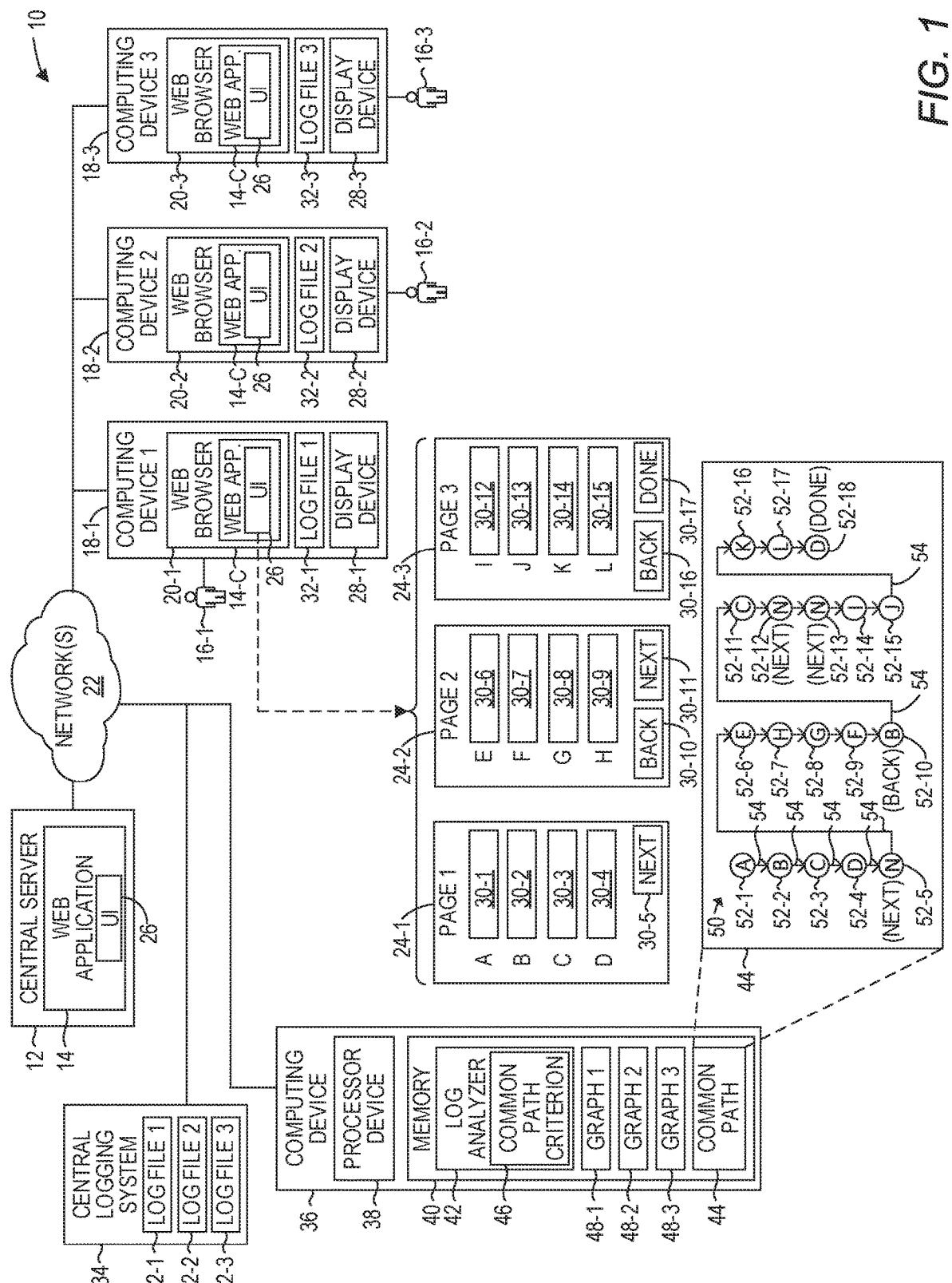
FIG. 1 is a block diagram of an environment in which examples disclosed herein can be practiced.

The examples set forth below represent the information to enable individuals to practice the examples and illustrate the best mode of practicing the examples. Upon reading the following description in light of the accompanying drawing figures, individuals will understand the concepts of the disclosure and will recognize applications of these concepts not particularly addressed herein. It should be understood that these concepts and applications fall within the scope of the disclosure and the accompanying claims.

Any flowcharts discussed herein are necessarily discussed in some sequence for purposes of illustration, but unless otherwise explicitly indicated, the examples are not limited to any particular sequence of steps. The use herein of ordinals in conjunction with an element is solely for distinguishing what might otherwise be similar or identical labels, such as "first message" and "second message," and does not imply a priority, a type, an importance, or other attribute, unless otherwise stated herein. The term "about" used herein in conjunction with a numeric value means any value that is within a range of ten percent greater than or ten percent less than the numeric value. As used herein and in the claims, the articles "a" and "an" in reference to an element refers to "one or more" of the element unless otherwise explicitly specified. The word "or" as used herein and in the claims is inclusive unless contextually impossible. As an example, the recitation of A or B means A, or B, or both A and B.

User interfaces (UIs) are increasingly important as more and more tasks become automated. A well-designed UI can distinguish one program over competitive programs. UIs can be quite complex, and while a designer of a UI may anticipate a certain user interaction, often a user has many, many different choices in how the user interacts with the UI, including, by way of non-limiting example, the chronological order via which the user interacts with various UI controls, whether or not the user activates optional features such as tips or hints, whether the user moves forward or backwards among pages of the user interface, particular options selected by the user, the actual data entered by the user, and the like.

Software is often revised to add new features and to fix bugs. Each software modification results in the possibility that a new bug (fault) will be introduced into the software. Accordingly, software is often extensively tested prior to releasing the software to customers or using the software in a production environment. With software that utilizes a UI, it may be impractical or impossible to effectively test each possible sequence of UI inputs that may be taken by a user with respect to the UI. Moreover, even if possible to do so, it may be that the vast majority of users interact with the UI similarly, and testing a small subset of UI interaction sequences would ensure that the UI operates correctly for the vast majority of users.

The examples disclosed herein determine user behavior with a UI using UI log records. Based on knowledge regarding how users interact with the UI, one or more testing scripts may be automatically generated and used to test those sequences of UI interactions that are most commonly performed in actual use of the UI. In some examples, a UI designer may use the knowledge regarding how users interact with the UI to redesign the UI. In another implementation, a web application that uses the UI may have access to information that identifies, on a user-by-user basis, how the user normally interacts with the UI, and may dynamically alter the UI for each user based on such information.

In particular, as a user interacts with a UI of an application, the application generates log records that capture the user's inputs, including which UI control the user is interacting with, which selections are made, the chronology of which UI controls were interacted with, an order of travel between pages of the UI, and the like. A log analyzer subsequently accesses the log file and analyzes the log records to determine the sequence and manner in which the user interacted with the UI. In some implementations, this process is done for a plurality of different users, and a common path through the UI input controls of the UI is determined. The common path can be used, for example, to automatically generate testing procedures, such as scripts, that interact with the UI input controls of the UI in the same sequence as that of the common path.

FIG. 1 is a block diagram of an environment 10 in which examples disclosed herein can be practiced. The environment 10 includes a central server 12 that includes a web application 14 used by a plurality of users 16-1-16-3 (generally, users 16), as described in greater detail below, to accomplish some task. The task may be any suitable task that can be implemented by a web application, including, by way of non-limiting example, the creation of a virtual machine, the generation of a software package, the migration of a virtual machine from one computing host to another computing host, and the like.

The user 16-1 is associated with a computing device 18-1 which includes a web browser 20-1, a processor device (not illustrated) and a memory (not illustrated). The computing device 18-1 is communicatively coupled to the central server 12 via a network 22. The user 16-1 enters information, such as a uniform resource identifier (URI) of the web application 14, into the web browser 20-1 that requests the web application 14 from the central server 12. The web application 14 comprises a multiple-page user interface (UI) 26 that facilitates the accomplishment of some task. In response to the request, the central server 12 sends a web application 14-C, which is a client component of the web application 14, to the web browser 20-1. The web application 14-C includes the multiple-page UI 26.

The web browser 20-1 initially presents a user interface (UI) page 24-1 on a display device 28-1. The UI page 24-1 comprises a plurality of user input controls 30-1-30-5. In this example, the user input controls 30-1-30-4 are UI text fields, and the user input control 30-5 is a UI button, but the examples disclosed herein are applicable to UIs with any type of UI components, including, by way of non-limiting example, buttons, text fields, checkboxes, radio buttons, dropdown lists, list boxes, toggles, sliders, and the like.

In this example, the user input controls 30-1-30-5 have corresponding labels "A", "B", "C", "D", and "NEXT." The user 16-1 performs a UI input on the UI page 24-1 by selecting one of the user input controls 30-1-30-5, such as via a mouse click. When the user 16-1 performs a UI input, such as a mouse click, a keypress, or the like via an input device such as a mouse or a keyboard, a UI event is generated that is detected by the web application 14. The term "UI event" refers to the events generated by the web browser 20-1 in response to a user's manipulation of an input device on the UI page 24-1. Examples of UI events are described, for example, in "UI Events W3C Working Draft, 30 May 2019" available at www.w3.org/TR/uievents/.

In this example, it will be assumed that the user 16-1 clicks on the user input control 30-1. In response, the web application 14-C changes the focus to the user input control 30-1 and generates a log record that records the UI event that resulted from clicking on the user input control 30-1, in this case a focus UI event. The web application 14-C also records in the log record the user input control 30-1 with which the particular UI event corresponds. The web application 14-C may also record in the log record the label that corresponds to the user input control 30-1, in this case the label "A", and a current value of the user input control 30-1, which initially is null (i.e., no value). The web application 14-C may also record the current values of the other input controls 30-2-30-4, and the particular page of the multiple-page UI 26 which is currently being presented on the display device 28-1, in this case the page "Page 1". The web application 14-C may also store any desired environmental information, such as a name and version of the web browser 20-1, the processor type and amount of memory of the computing device 18-1, the operating system of the computing device 18-1, and the like. The web application 14-C may also include in the log record a timestamp that identifies a date and time of the UI input by the user 16-1. The web application 14-C stores the log record in a log file 32-1. Note that while for purposes of illustration the log file 32-1 is shown as being associated with the computing device 18-1, in practice, the log file 32-1 may alternatively be located remotely from the computing device 18-1, such as on a central logging system 34.

The user 16-1 may then enter data into the user input control 30-1, such as the text "HOME". Each keypress by the user 16-1 is a UI input by the user 16-1 that generates a particular UI event, such as a keypress event. The web application 14, as described above, generates and stores another log record upon each such keypress. The user 16-1, after providing information into the user input controls 30-1-30-4, selects the user input control 30-5, such as by clicking on the user input control 30-5 with a mouse. In response, the web application 14-C presents the UI page 24-2 on the display device 28-1. Note that the web application 14-C may be communicating with the web application 14 on an ongoing basis, and, in response to inputs from the user 16-1 into the UI 26, receiving data from the web application 14.

In a similar manner to that described above with regard to the UI page 24-1, the user 16-1 interacts with and provides information into the user input controls 30-6-30-9, which have corresponding labels "E", "F", "G", and "H", respectively. The user 16-1 may also select a user input control 30-10 to return to the UI page 24-1 if the user 16-1 wishes to review or modify the information previously entered into the user input controls 30-1-30-4. The user 16-1 eventually selects a user input control 30-11. In response, the web application 14-C presents the UI page 24-3 on the display device 28-1.

The user 16-1 interacts with and provides information into the user input controls 30-12-30-15, which have corresponding labels "I", "J", "K", and "L", respectively. The user 16-1 may also select a user input control 30-16 to return to the UI page 24-2. The user 16-1 eventually selects a user input control 30-17 to indicate that the user 16-1 is finished entering data into the UI 26. As the user 16-1 interacted with each of the user input controls 30-1-30-17, the web application 14-C generated and stored log records into the log file 32-1 for all, or for selected, UI events caused by the UI inputs of the user 16-1.

In substantially the same manner, the user 16-2 interacts with the UI 26 of the web application 14-C via a web browser 20-2 on a computing device 18-2. The UI 26 is presented to the user 16-2 on a display device 28-2. The user 16-2 interacts with the input controls 30-1-30-17 of the UI 26, and when finished, selects the user input control 30-17. As the user 16-2 interacts with each of the user input controls 30-1-30-17, the web application 14-C generates and stores log records into a log file 32-2 for all, or for selected, UI events caused by the UI inputs of the user 16-2. Note that the user 16-2 may have interacted with the user input controls 30-1-30-17 in a different order than that of the user 16-1, and may have traversed back and forth through the UI pages 24-1-24-3 using the user input controls 30-5, 30-10, 30-11, and 30-16 in a completely different manner than that of the user 16-1.

In substantially the same manner, the user 16-3 interacts with the UI 26 of the web application 14-C via a web browser 20-3 on a computing device 18-3. The UI 26 is presented to the user 16-3 on a display device 28-3. The user 16-3 interacts with the user input controls 30-1-30-17 of the UI 26, and when finished, selects the user input control 30-17. As the user 16-3 interacts with each of the user input controls 30-1-30-17, the web application 14-C generates and stores log records into a log file 32-3 for all, or for selected, UI events caused by the UI inputs of the user 16-3. Note that the user 16-3 may have interacted with the user input controls 30-1-30-17 in a particular different order than that of the users 16-1 and 16-2, and may have traversed back and forth through the UI pages 24-1-24-3 using the user input controls 30-5, 30-10, 30-11, and 30-16 in a completely different manner than that of the users 16-1 and 16-2.

After the log files 32-1-32-3 are generated, they may be transferred to a consolidated location, such as the central logging system 34. The environment 10 also includes a computing device 36, which may be geographically remote from the computing devices 18. The computing device 36 includes a processor device 38 that is coupled to a memory 40. A log analyzer 42 accesses the log files 32-1-32-3 on the central logging system 34. The log analyzer 42 analyzes each of the log files 32-1-32-3 to identify a path of a plurality of different potential paths taken by the corresponding users 16-1-16-3 from a start user input control, such as, in this example, the user input control 30-1, to an end user input control, such as the user input control 30-17, to accomplish the task. The log analyzer 42 then stores information that identifies a common path 44 from the start user input control 30-1 to the end user input control 30-17 based on the path taken by the corresponding user 16-1-16-3 for each log file 32-1-32-3 and a common path criterion 46. It will be noted that while, for purposes of illustration, the paths taken by only three users are discussed herein, in practice, the log analyzer 42 may analyze hundreds of thousands of log files 32 generated in response to hundreds or thousands of different users interacting with the UI 26.

Because the log analyzer 42 is a component of the computing device 36, functionality implemented by the log analyzer 42 may be attributed to the computing device 36 generally. Moreover, in examples where the log analyzer 42 comprises software instructions that program the processor device 38 to carry out functionality discussed herein, functionality implemented by the log analyzer 42 may be attributed herein to the processor device 38.

The common path criterion 46 may comprise any desired criterion or criteria for determining a common path taken by the users 16-1-16-3 through the user input controls 30-1-30-17. For example, the common path criterion 46 may be to determine the most common identical path from the user input control 30-1 to the user input control 30-17. As an example, where hundreds of different log files 32 are analyzed, some number of the corresponding hundreds of users 16 will have taken identical paths through the user input controls 30-1-30-17. The most common identical path through the user input controls 30-1-30-17 may be identified as the common path 44. In other implementations, the common path criterion 46 may be to determine the shortest path between the user input control 30-1 and the user input control 30-17.

In some examples, the log analyzer 42 analyzes the log files 32-1-32-3, and generates corresponding directed graphs 48-1-48-3 based on the log records in the log files 32-1-32-3. As will be described in greater detail below, each directed graph 48-1-48-3 comprises a plurality of nodes and a plurality of edges, at least some of the nodes corresponding to different user input controls 30-1-30-17, each edge connecting two nodes of the plurality of nodes and having a direction that identifies a chronological order of user interaction with the user input controls 30-1-30-17 that correspond to the two nodes.

In some examples, the log analyzer 42 combines the directed graphs 48-1-48-3 into a combined directed graph that contains each node and each edge in the plurality of directed graphs 48-1-48-3. The log analyzer 42 determines, for each edge in the combined directed graph a probability value based on an occurrence of the edge in the plurality of directed graphs. The common path criterion 46 may be based on the probability values of the edges, such that the common path from the start user input control 30 to the end user input control 30 is defined by traversing the edges of the combined graph from a start node corresponding to the start user input control 30 to an end node corresponding to the end user input control 30, and for each node that has a plurality of different edges, selecting an edge of the plurality of different edges with a highest probability value.

In this example, the common path 44 is defined via a graph 50 that comprises a plurality of nodes 52-1-52-18, and a plurality of edges 54 (with only some edges 54 numbered for purposes of space), each edge 54 connecting two of the nodes 52-1-52-18, and having a direction (illustrated in FIG. 1 via an arrow) that identifies a chronological order of user interaction with the user input controls 30-1-30-17.

In the graph 50, the label of each node 52-1-52-18 is identical to the label of the user input control 30-1-30-17 to which the node 52-1-52-18 corresponds. Thus, for example, the node 52-1 corresponds to the user input control 30-1 and the node 52-7 corresponds to the user input control 30-9. The graph 50 indicates that the common path 44 taken by the users 16-1-16-3 was through the user input controls 30-1-30-17 in the following order:

user input control 30-1 ("A");
user input control 30-2 ("B");
user input control 30-3 ("C");
user input control 30-4 ("D");
user input control 30-5 ("NEXT");
user input control 30-6 ("E");
user input control 30-9 ("H");
user input control 30-8 ("G");
user input control 30-7 ("F");
user input control 30-10 ("BACK");
user input control 30-3 ("C");
user input control 30-5 ("NEXT");
user input control 30-11 ("NEXT");
user input control 30-12 ("I");
user input control 30-13 ("J");
user input control 30-14 ("K");
user input control 30-15 ("L"); and
user input control 30-17 ("DONE").

The graph 50 may be used in any number of ways. In some examples, a UI designer may use the graph 50 to redesign the UI 26 in an attempt to minimize the users 16-1-16-3 from returning to the UI page 24-1 from the UI page 24-2. The UI designer may also attempt to reorder certain of the user input controls 30-1-30-17 with respect to one another so that users 16 will be more likely to interact with the user input controls 30-1-30-17 in a top-to-bottom order.

The graph 50 may be provided to a testing process that automatically generates inputs to modified versions of the web application 14 to ensure that the web application 14 operates properly after such modifications with respect to at least the common path 44 of most user interactions. The graph 50 may also be used to automatically generate testing procedures, such as scripts, that interact with the user input controls 30 of the user interface 26 in the same sequence as that of the common path 44 for testing purposes. In some implementations, the web application 14 may have access to information that identifies, on a user-by-user basis, how each respective user 16 normally interacts with the UI 26, and may dynamically alter the UI 26 for each user based on such information.

Figure 2:
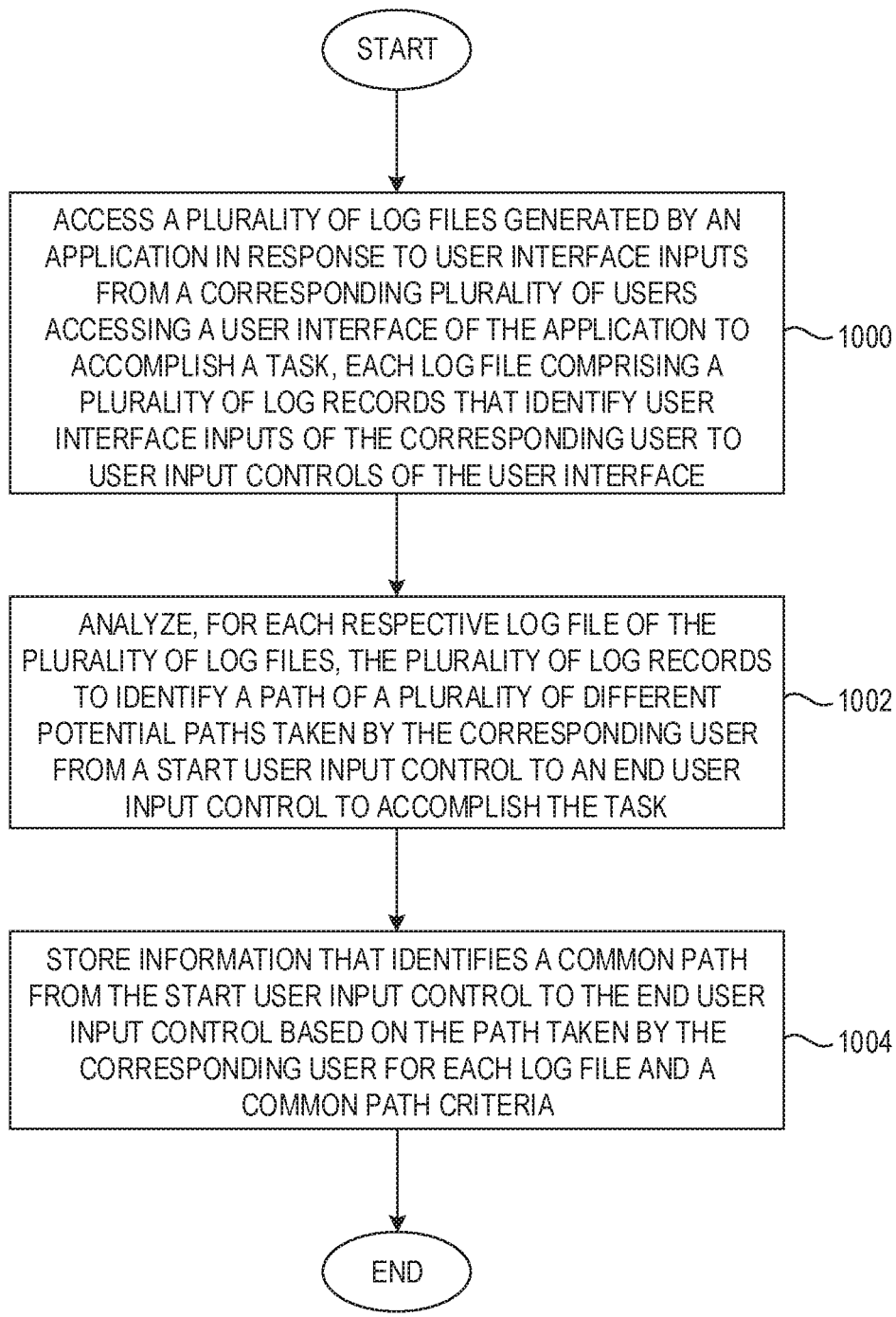
FIG. 2 is a flowchart of a process for determining user behavior using user interface (UI) log records according to one implementation.

FIG. 2 is a flowchart of a process for determining user behavior using UI log records according to one implementation. FIG. 2 will be discussed in conjunction with FIG. 1. The log analyzer 42 accesses the plurality of log files 32-1-32-3 generated by the web application 14 in response to UI inputs from the corresponding plurality of users 16-1-16-3 accessing the UI 26 of the web application 14 to accomplish a task. Each log file 32-1-32-3 comprises a plurality of log records that identify UI inputs of the corresponding user 16-1-16-3 to user input controls 30 of the UI 26 (FIG. 2, block 1000). The log analyzer 42 analyzes, for each respective log file 32-1-32-3 of the plurality of log files 32-1-32-3, the plurality of log records to identify a path of a plurality of different potential paths taken by the corresponding user 16-1-16-3 from a start user input control 30 to an end user input control 30 to accomplish the task (FIG. 2, block 1002). The log analyzer 42 stores information that identifies the common path 44 from the start user input control 30 to the end user input control 30 based on the path taken by the corresponding user 16-1-16-3 for each log file 32-1-32-3 and the common path criterion 46 (FIG. 2, block 1004).

Figure 3:
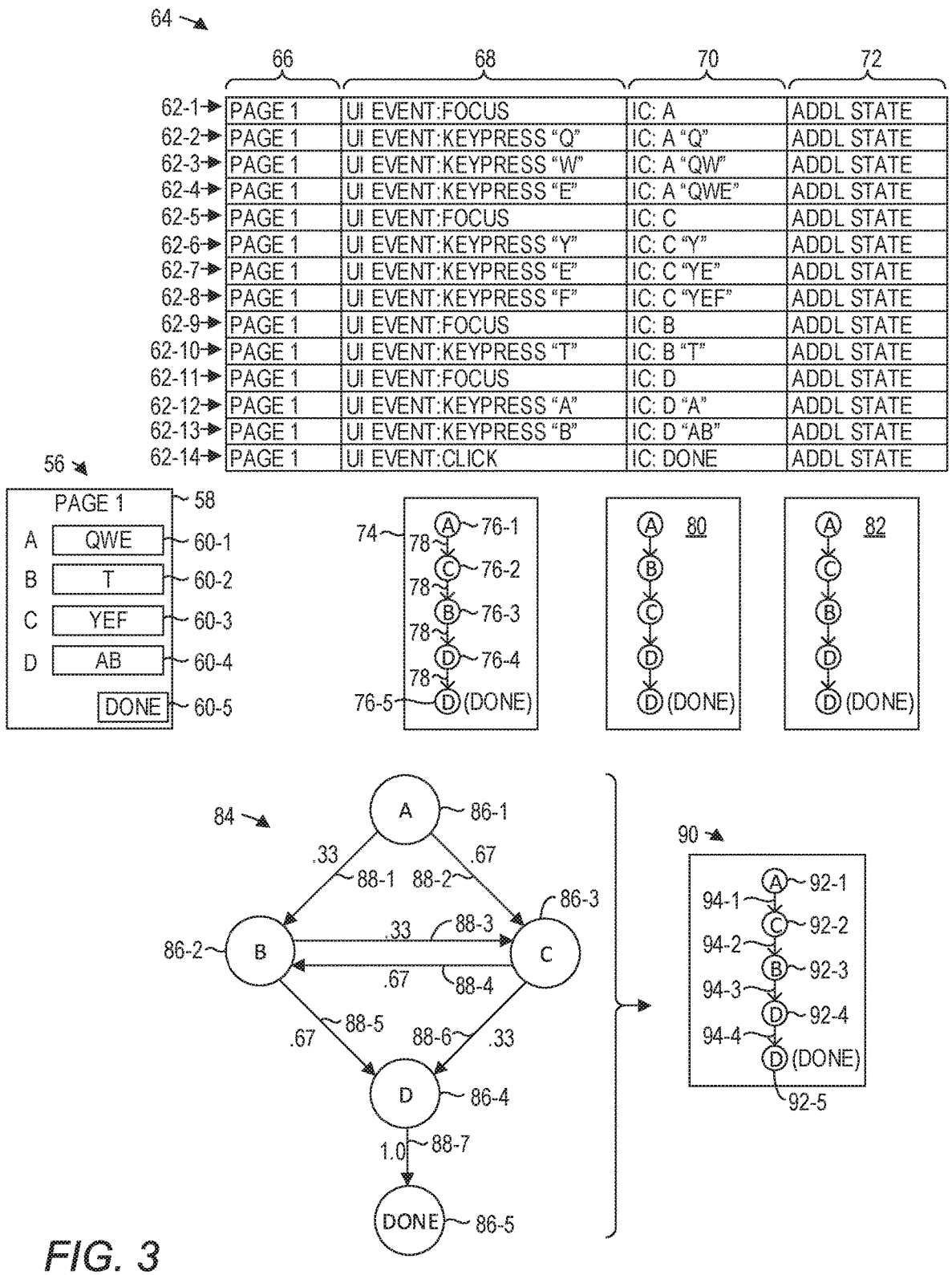
FIG. 3 is a block diagram illustrating UI log records of a log file, the creation of a directed graph based on the UI log records, and the determination of a common path according to one implementation.

FIG. 3 is a block diagram illustrating UI log records of a log file, the creation of a directed graph based on the UI log records, and the determination of a common path according to one implementation. In this example, it will be assumed that the users 16-1-16-3 interacted with a UI 56 of a web application to accomplish some task. The UI 56 has a single UI page 58. The UI page 58 has five user input controls 60-1-60-5 that have corresponding labels "A", "B", "C", "D", and "DONE", respectively. As the user 16-1 interacts with the UI page 58, the corresponding web application generates and stores a plurality of log records 62-1-62-14 (generally, log records 62) in a log file 64. Each log record 62 includes a page identifier field 66 that contains information that identifies the page of the UI 56 to which the log record 62 corresponds; a UI event field 68 that contains information that identifies the UI event generated in response to a user input of the user 16-1; a user input control value field 70 that contains information that identifies the user input control 60-1-60-5 with which the UI event is associated, and which identifies a value of such user input control 60-1-60-5 after the user input; and an additional state field 72 that contains information that identifies any additional state information that may be useful, such as, by way of non-limiting example, a name and version of the web browser 20-1, the processor type and amount of memory of the computing device 18-1, the operating system of the computing device 18-1, and the like. Note that although, for purposes of illustration, the user input control value field 70 identifies the user input control 60-1-60-5 with which the UI event is associated via the label of the user input control 60-1-60-5, in practice other information may be used to identify the user input control 60-1-60-5 with which the UI event is associated, such as a unique identifier associated with the user input control 60-1-60-5, or any other suitable information.

Fields 68 and 70 of the log record 62-1 indicate that the first user input caused a focus event on the user input control 60-1. The user 16-1 may, for example, have selected the user input control 60-1 with a mouse click. Fields 68 and 70 of the log record 62-2 indicate that the user 16-1 next pressed the "Q" key. Fields 68 and 70 of the log record 62-3 indicate that the user 16-1 next pressed the "W" key, and that the value of the user input control 60-1 after pressing the "W" key is "QW". Fields 68 and 70 of the log record 62-4 indicate that the user 16-1 next pressed the "E" key, and that the value of the user input control 60-1 after pressing the "E" key is "QWE". Fields 68 and 70 of the log record 62-5 indicate that the next user input caused a focus event on the user input control 60-3.

Fields 68 and 70 of the log record 62-6 indicate that the user 16-1 next pressed the "Y" key. Fields 68 and 70 of the log record 62-7 indicate that the user 16-1 next pressed the "E" key, and that the value of the user input control 60-3 after pressing the "E" key is "YE". Fields 68 and 70 of the log record 62-8 indicate that the user 16-1 next pressed the "F" key, and that the value of the user input control 60-3 after pressing the "F" key is "YEF".

Fields 68 and 70 of the log record 62-9 indicate that the next user input caused a focus event on the user input control 60-2. Fields 68 and 70 of the log record 62-10 indicate that the user 16-1 next pressed the "T" key. Fields 68 and 70 of the log record 62-11 indicate that the next user input caused a focus event on the user input control 60-4. Fields 68 and 70 of the log record 62-12 indicate that the user 16-1 next pressed the "A" key. Fields 68 and 70 of the log record 62-13 indicate that the user 16-1 next pressed the "B" key, and that the value of the user input control 60-4 after pressing the "B" key is "AB". Fields 68 and 70 of the log record 62-14 indicate that the user 16-1 next selected the user input control 60-5 ("DONE") to indicate that the user 16-1 was finished.

Note that while certain UI events have been illustrated in the log file 64, the particular UI events for which log records are generated may be implementation dependent. For example, UI events that indicate a change in focus may or may not be captured in some implementations. Moreover, while for purposes of illustration the actual data entered by the user 16-1 has been logged, in other implementations, for purposes of privacy, such information may not be logged, or, for certain fields, such as password fields, such data may not be logged.

The log analyzer 42 accesses the log records 62 in the log file 64. The log analyzer 42 generates a directed graph 74 comprising a plurality of nodes 76-1-76-5 and a plurality of edges 78, at least some of the nodes 76-1-76-5 corresponding to different user input controls 60-1-60-5, and each edge 78 connecting two of the nodes 76-1-76-5 and having a direction that identifies a chronological order of user interaction with the user input controls 60-1-60-5 that correspond to the two of the nodes 76-1-76-5. The directed graph 74 indicates that the path taken by the user 16-1 through the UI page 58 was through the user input controls 60-1-60-5 in the following order:
  user input control 60-1 ("A");
  user input control 60-3 ("C");
  user input control 60-2 ("B");
  user input control 60-4 ("D"); and
  user input control 60-5 ("DONE").

The log analyzer 42 may generate the directed graph 74 by generating a new node 76-1-76-5 each time a different type of UI event is identified in the UI event field 68 of a chronologically successive log record 62 (e.g., the type of UI event in a log record 62 differs from the type of UI event in an immediately preceding log record 62). In this example, the nodes associated with the "FOCUS" events are not illustrated in the directed graph 74. In other implementations, the log analyzer 42 may generate the directed graph 74 by generating a new node 76-1-76-5 each time a different user input control 60-1-60-5 is identified in the user input control value field 70 of a chronologically successive log record 62 (e.g., the user input control 60-1-60-5 in a log record 62 differs from the user input control 60-1-60-5 in an immediately preceding log record 62). Thus, a single node 76 may correspond to a series of user inputs to the same user input control 60-1-60-5.

Assume that the users 16-2 and 16-3 also use the UI page 58 to accomplish the same task, and that the log analyzer 42 generates, based on the log records generated in response to the actions of the users 16-2 and 16-3, directed graphs 80 and 82, respectively. The directed graph 80 identifies the path through the user input controls 60-1-60-5 taken by the user 16-2, and the directed graph 82 identifies the path through the user input controls 60-1-60-5 taken by the user 16-3.

The log analyzer 42 accesses the three directed graphs 74, 80 and 82, and combines the directed graphs 74, 80 and 82 to generate a combined directed graph 84, which contains nodes and edges that correspond to the nodes and edges in the plurality of directed graphs 74, 80 and 82. The combined directed graph 84 includes plurality of nodes 86-1-86-5 (generally, nodes 86) which correspond, respectively, to the user input controls 60-1-60-5, and which correspond to the nodes in the directed graphs 74, 80 and 82 that correspond to the same user input controls 60-1-60-5. In particular, the node 86-1 corresponds to the user input control 60-1; the node 86-2 corresponds to the user input control 60-2; the node 86-3 corresponds to the user input control 60-3; the node 86-4 corresponds to the user input control 60-4; and the node 86-5 corresponds to the user input control 60-5.

The combined directed graph 84 also includes a plurality of edges 88-1-88-7 (generally, edges 88), each edge 88 connecting two nodes 86 and having a direction that identifies a chronological order of user interaction between two user input controls 60-1-60-5 that correspond to the two nodes 86 connected by the edge 88.

The log analyzer 42 determines, for each edge 88 in the combined directed graph 84, a probability value based on an occurrence of a corresponding edge in the plurality of directed graphs 74, 80 and 82. As an example, the combined directed graph 84 has an edge 88-1 that connects the nodes 86-1 and 86-2, and that points to the node 86-2, and thus indicates at least one of the users 16-1-16-3 chronologically interacted with the user input control 60-1, which corresponds to the node 86-1, and then with the user input control 60-2, which corresponds to the node 86-2. The log analyzer 42 analyzes the directed graphs 74, 80 and 82, and determines that ⅓, or 33% of the users 16-1-16-3 chronologically interacted with the user input control 60-1 followed by the user input control 60-2, and thus assigns a probability value of 0.33 to the edge 88-1. Similarly, the combined directed graph 84 has an edge 88-2 that connects the nodes 86-1 and 86-3, and that points to the node 86-3, and thus indicates at least one of the users 16-1-16-3 chronologically interacted with the user input control 60-1, which corresponds to the node 86-1, and then with the user input control 60-3, which corresponds to the node 86-3. The log analyzer 42 analyzes the directed graphs 74, 80 and 82, and determines that ⅔, or 66% of the users 16-1-16-3 chronologically interacted with the user input control 60-1 followed by the user input control 60-3, and thus assigns a probability value of 0.67 to the edge 88-2. The log analyzer 42 similarly assigns a probability value to each of the other edges 88-3-88-7.

The log analyzer 42 then generates a common path graph 90 that identifies a common path through the user input controls 60-1-60-5 based on a common path criterion 46 that utilizes the probabilities associated with the edges 88. In particular, the log analyzer 42 traverses the edges 88 from a start node 86 that corresponds to a start user input control 60, in this example, the node 86-1 that corresponds to the user input control 60-1, to an end node 86 that corresponds to an end user input control 60, in this example, the node 86-5 that corresponds to the user input control 60-5. For each node 86 that has a plurality of different edges 88 extending therefrom, the log analyzer 42 selects the edge 88 with the highest probability value.

In this example, the log analyzer 42 begins with the node 86-1, which corresponds to the user input control 60-1, and generates a node 92-1 in the common path graph 90 that corresponds to the user input control 60-1. The node 86-1 has two edges 88-1 and 88-2 extending from the node 86-1. The edge 88-2 has a higher probability value, and thus the log analyzer 42 traverses the edge 88-2 to the node 86-3, which corresponds to the user input control 60-3, and generates an edge 94-1 and a node 92-2 in the common path graph 90 that corresponds to the user input control 60-3. The edge 94-1 indicates a chronological order from the node 92-1 to the node 92-2. The node 86-3 has two edges 88-4 and 88-6 extending from the node 86-3. The edge 88-4 has a higher probability value, and thus the log analyzer 42 traverses the edge 88-4 to the node 86-2, which corresponds to the user input control 60-2, and generates a node 92-3 in the common path graph 90 that corresponds to the user input control 60-2, and an edge 94-2 that points from the node 92-2 to the node 92-3.

There is a single edge 88-5 extending from the node 86-2 to the node 86-4. The log analyzer 42 traverses the edge 88-5 to the node 86-4, which corresponds to the user input control 60-4, and generates a node 92-4 in the common path graph 90 that corresponds to the user input control 60-4, and an edge 94-3 that points from the node 92-3 to the node 92-4. There is a single edge 88-7 extending from the node 86-4 to the node 86-5. The log analyzer 42 traverses the edge 88-7 to the node 86-5, which corresponds to the user input control 60-5, and generates a node 92-5 in the common path graph 90 that corresponds to the user input control 60-5, and an edge 94-4 that points from the node 92-4 to the node 92-5. This completes the common path graph 90, which now identifies a common path taken through the user input controls 60-1-60-5 by the users 16-1-16-3.

Figure 4:
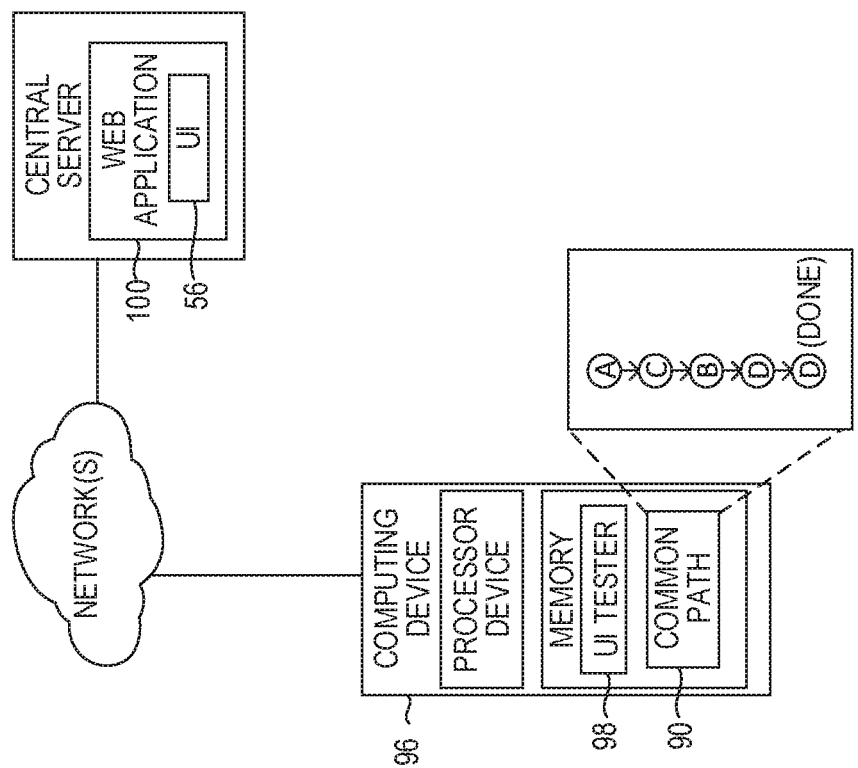
FIG. 4 is a block diagram illustrating a use of a common path graph according to one example.

FIG. 4 is a block diagram illustrating a use of the common path graph 90 according to one example. A computing device 96 includes a UI tester 98. The UI tester 98 is a testing process that tests UIs of web applications. In this example, the UI tester 98 accesses the common path graph 90 and submits data to a web application 100 that contains the UI 56. The UI tester 98 submits data to the user input controls 60-1-60-5 in a same chronological order as identified by the common path graph 90. This may be performed, for example, as part of a validation process by the manufacturer of the web application 100 each time the web application 100 is modified.

Figure 5:
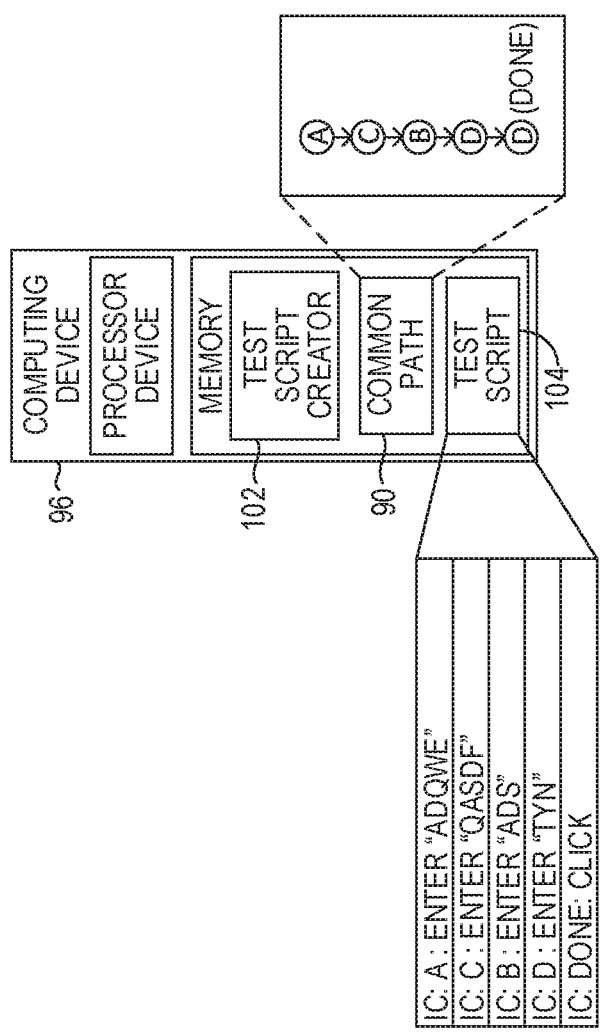
FIG. 5 is a block diagram illustrating a use of the common path graph according to another example.

FIG. 5 is a block diagram illustrating a use of the common path graph 90 according to another example. In this example, the computing device 96 includes a test script creator 102 that automatically generates a test script 104 that, when subsequently processed, causes the submission of data to the user input controls 60-1-60-5 of the UI 56 in a same chronological order as identified by the common path graph 90.

Figure 6:
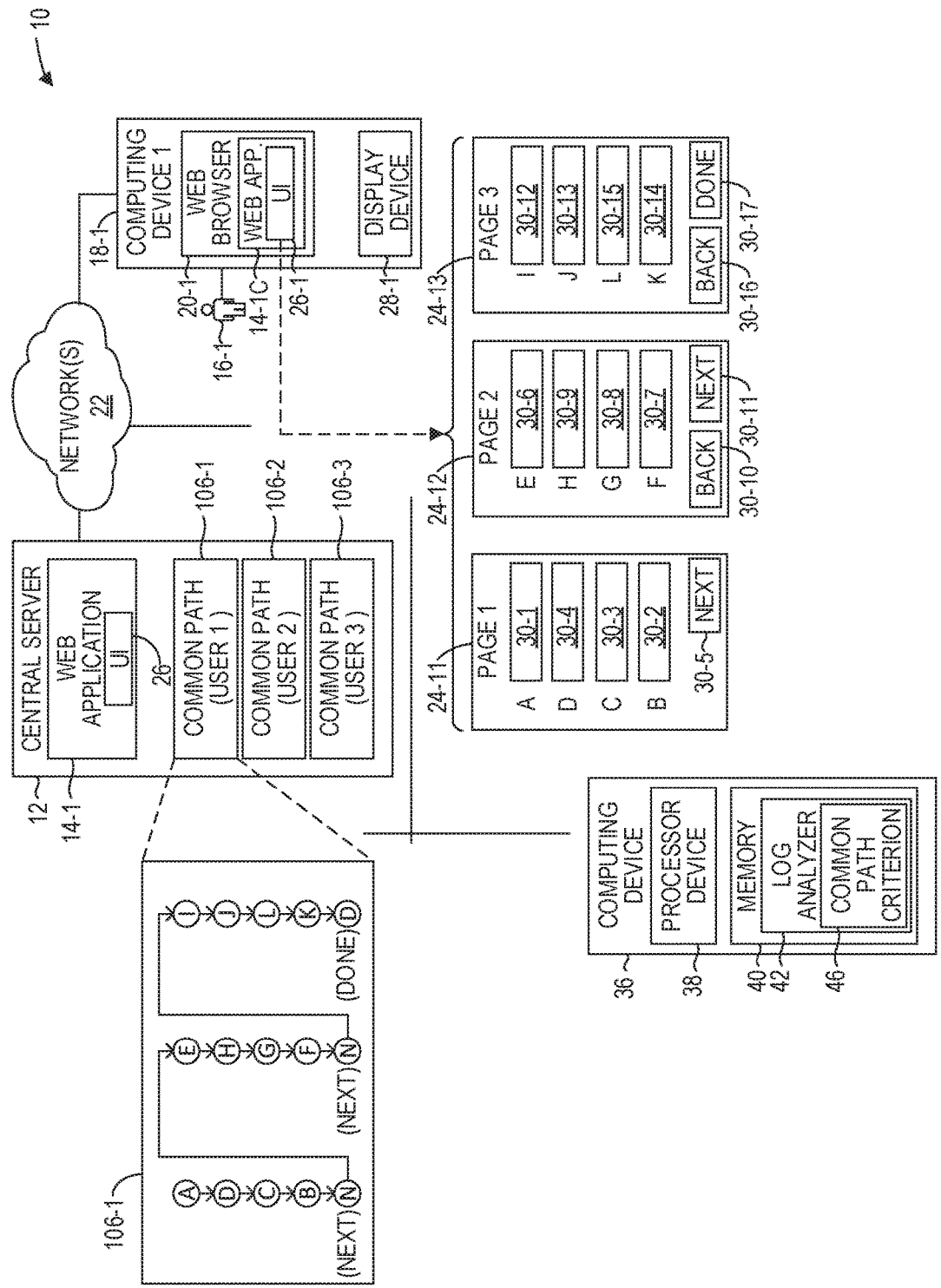
FIG. 6 is a block diagram of the environment illustrated in FIG. 1 according to another implementation.

FIG. 6 is a block diagram of the environment 10 illustrated in FIG. 1 according to another implementation. FIG. 6 omits components illustrated in FIG. 1 that are not overly relevant to the discussion herein. In this example, the log analyzer 42 analyzes log files 32 on a user-by-user basis, and generates a plurality of common paths 106-1-106-3, each of which identifies the particular common path taken by a corresponding user 16-1-16-3 after interacting with the UI 26 a plurality of different times. In this example, when the user 16-1 requests a web application 14-1, the web application 14-1 determines that the request originated from the user 16-1. The web application 14-1 accesses the common path 106-1 that corresponds to the user 16-1 and then automatically modifies the UI 26 to generate a UI 26-1 with a plurality of pages 24-11, 24-12 and 24-13 wherein the order of user input controls 30-1-30-17 are placed in a chronological order of access as identified in the common path 106-1. The central server 12 sends a web application 14-1C, which includes the UI 26-1, to the web browser 20-1. As the user 16-1 navigates the pages 24-11, 24-12 and 24-13 of the UI 26-1, the user 16-1 is thus presented with the user controls 30-1-30-17 in the order that the user 16-1 most commonly interacted with such user controls 30-1-30-17 previously. The user 16-1 may also be presented with user input controls 30-10 and 30-16, enabling the user 16-1 to return to a previous UI page 24.

Figure 7:
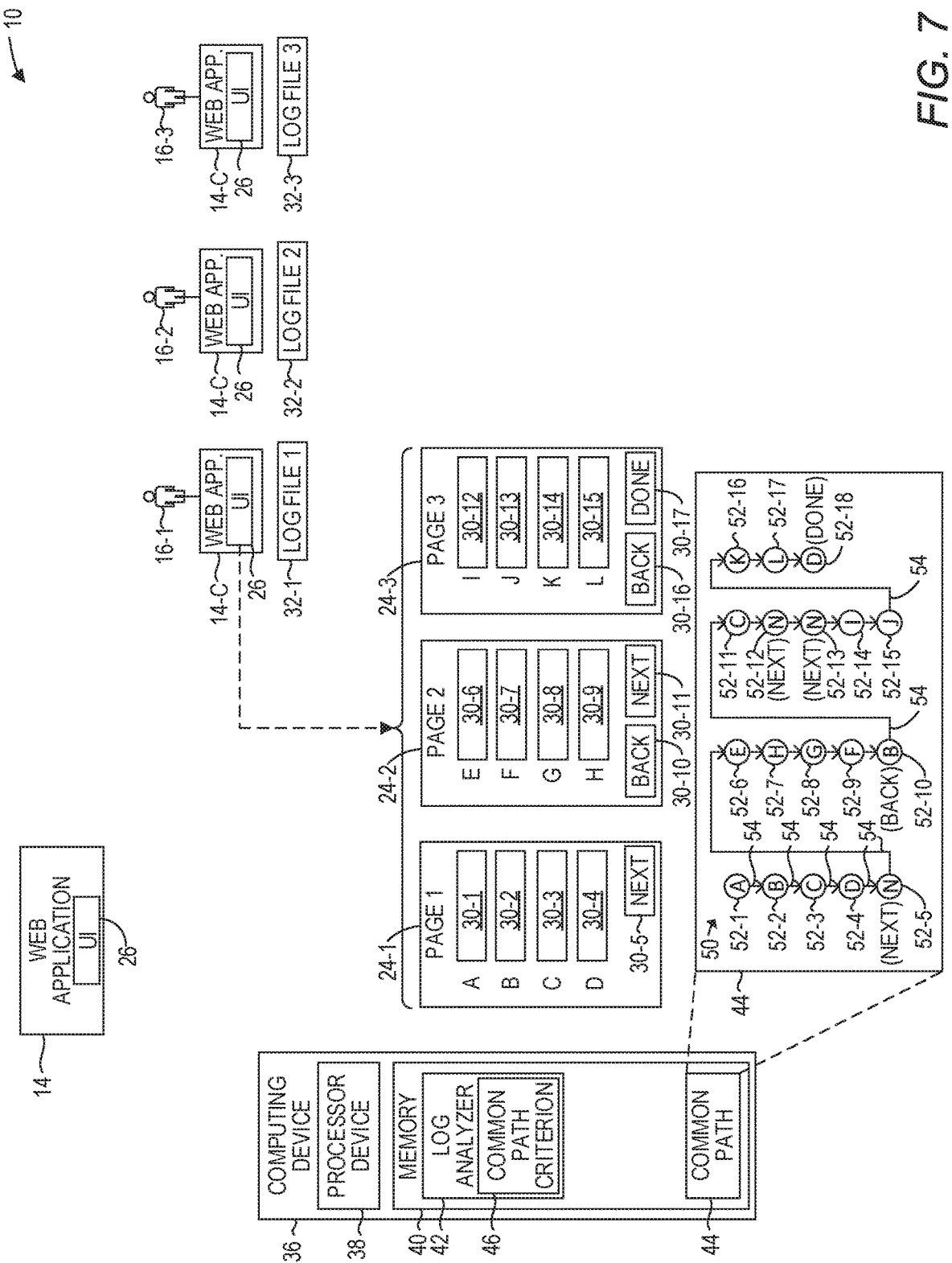
FIG. 7 is a simplified block diagram of the environment illustrated in FIG. 1 according to one implementation.

FIG. 7 is a simplified block diagram of the environment 10 according to one implementation. The processor device 38 accesses the plurality of log files 32-1-32-3 generated by the web application 14 in response to UI inputs from the corresponding plurality of users 16-1-16-3 accessing the UI 26 of the web application 14 to accomplish the task. Each log file 32-1-32-3 comprises a plurality of log records that identify user interface inputs of the corresponding user 16-1-16-3 to user input controls 30-1-30-17 of the UI 26. The processor device 38 analyzes, for each respective log file 32-1-32-3 of the plurality of log files 32-1-32-3, the plurality of log records to identify a path of a plurality of different potential paths taken by the corresponding user 16-1-16-3 from a start user input control 30-1-30-17 to an end user input control 30-1-30-17 to accomplish the task. The processor device 38 stores information that identifies a common path 44 from the start user input control 30-1-30-17 to the end user input control 30-1-30-17 based on the path taken by the corresponding user 16-1-16-3 for each log file 32-1-32-3 and the common path criterion 46.

Figure 8:
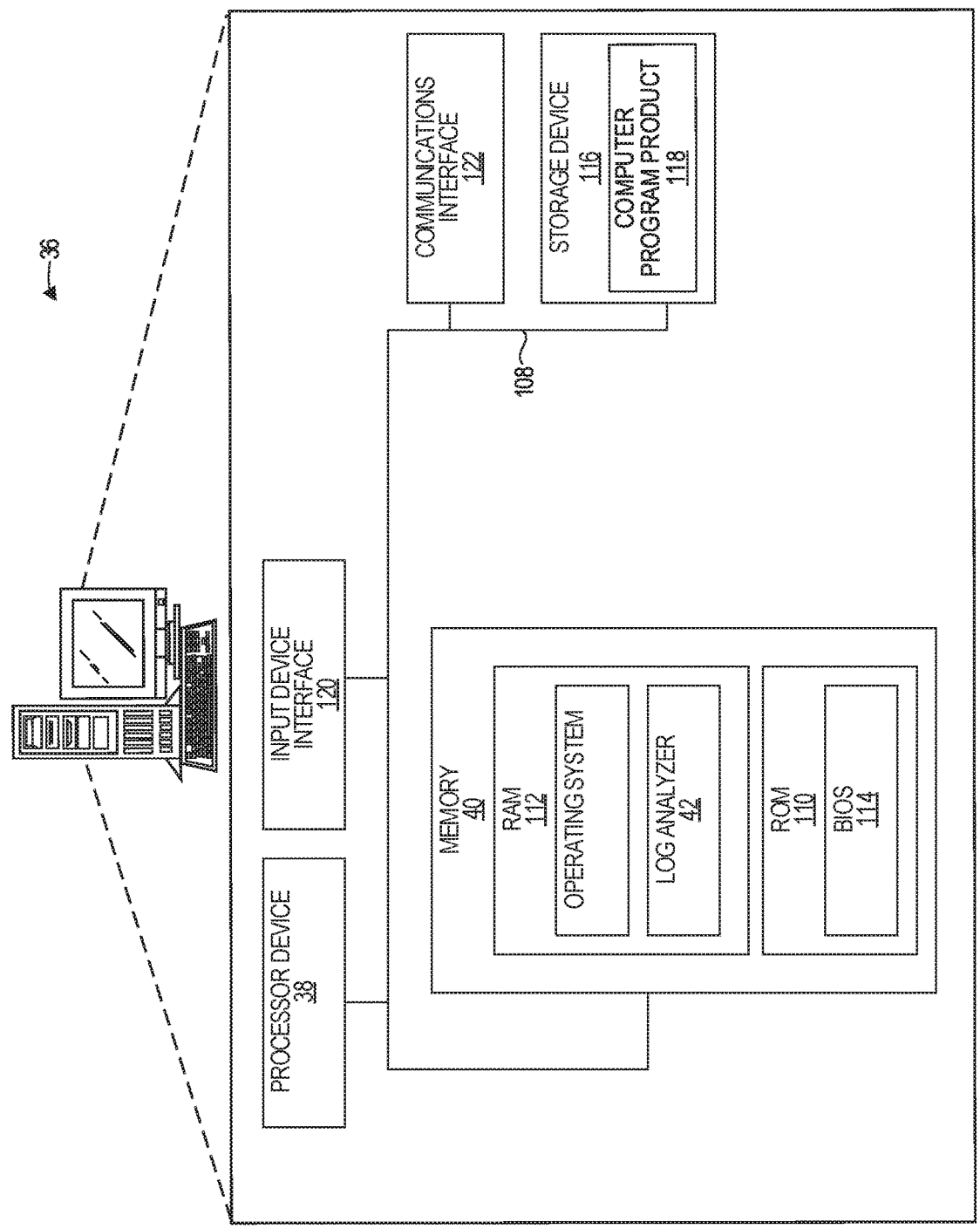
FIG. 8 is a block diagram of a computing device suitable for implementing examples disclosed herein according to one example.

FIG. 8 is a block diagram of the computing device 36 suitable for implementing examples according to one example. The computing device 36 may comprise any computing or electronic device capable of including firmware, hardware, and/or executing software instructions to implement the functionality described herein, such as a computer server, a desktop computing device, a laptop computing device, or the like. The computing device 36 includes the processor device 38, the memory 40, and a system bus 108. The system bus 108 provides an interface for system components including, but not limited to, the memory 40 and the processor device 38. The processor device 38 can be any commercially available or proprietary processor.

The system bus 108 may be any of several types of bus structures that may further interconnect to a memory bus (with or without a memory controller), a peripheral bus, and/or a local bus using any of a variety of commercially available bus architectures. The memory 40 may include non-volatile memory 110 (e.g., read-only memory (ROM), erasable programmable read-only memory (EPROM), electrically erasable programmable read-only memory (EEPROM), etc.), and volatile memory 112 (e.g., random-access memory (RAM)). A basic input/output system (BIOS) 114 may be stored in the non-volatile memory 110 and can include the basic routines that help to transfer information between elements within the computing device 36. The volatile memory 112 may also include a high-speed RAM, such as static RAM, for caching data.

The computing device 36 may further include or be coupled to a non-transitory computer-readable storage medium such as a storage device 116, which may comprise, for example, an internal or external hard disk drive (HDD) (e.g., enhanced integrated drive electronics (EIDE) or serial advanced technology attachment (SATA)), HDD (e.g., EIDE or SATA) for storage, flash memory, or the like. The storage device 116 and other drives associated with computer-readable media and computer-usable media may provide non-volatile storage of data, data structures, computer-executable instructions, and the like. Although the description of computer-readable media above refers to an HDD, it should be appreciated that other types of media that are readable by a computer, such as Zip disks, magnetic cassettes, flash memory cards, cartridges, and the like, may also be used in the operating environment, and, further, that any such media may contain computer-executable instructions for performing novel methods of the disclosed examples.

A number of modules can be stored in the storage device 116 and in the volatile memory 112, including an operating system and one or more program modules, such as the log analyzer 42, which may implement the functionality described herein in whole or in part. All or a portion of the examples may be implemented as a computer program product 118 stored on a transitory or non-transitory computer-usable or computer-readable storage medium, such as the storage device 116, which includes complex programming instructions, such as complex computer-readable program code, to cause the processor device 38 to carry out the steps described herein. Thus, the computer-readable program code can comprise software instructions for implementing the functionality of the examples described herein when executed on the processor device 38. The processor device 38, in conjunction with the log analyzer 42 in the volatile memory 112, may serve as a controller, or control system, for the computing device 36 that is to implement the functionality described herein.

An operator may also be able to enter one or more configuration commands through a keyboard, a pointing device such as a mouse (not illustrated), or a touch-sensitive surface such as a display device. Such input devices may be connected to the processor device 38 through an input device interface 120 that is coupled to the system bus 108 but can be connected by other interfaces such as a parallel port, an Institute of Electrical and Electronic Engineers (IEEE) 1394 serial port, a Universal Serial Bus (USB) port, an IR interface, and the like. The computing device 36 may also include a communications interface 122 suitable for communicating with the network 22 as appropriate or desired.

Individuals will recognize improvements and modifications to the preferred examples of the disclosure. All such improvements and modifications are considered within the scope of the concepts disclosed herein and the claims that follow.

What is claimed is:

1. A method comprising:
    accessing a plurality of log files generated by an application in response to user interface inputs from a corresponding plurality of users accessing a user interface of the application to accomplish a task, each log file comprising a plurality of log records that identify user interface inputs of the corresponding user to user input controls of the user interface;
    analyzing, for each respective log file of the plurality of log files, the plurality of log records to identify a path of a plurality of different potential paths taken by the corresponding user from a start user input control to an end user input control to accomplish the task;
    storing information that identifies a common path from the start user input control to the end user input control based on the path taken by the corresponding user for each log file and a common path criterion; and
    after modification of the application, providing a directed graph corresponding to at least one log file of the plurality of log files to a testing process that automatically generates inputs based on the common path, the directed graph comprising a plurality of nodes and a plurality of edges.

2. The method of claim 1 wherein analyzing, for each respective log file of the plurality of log files, the plurality of log records to identify the path of the plurality of different potential paths taken by the corresponding user from the start user input control to the end user input control to accomplish the task further comprises:
    generating a plurality of directed graphs, each directed graph of the plurality of directed graphs corresponding to one log file of the plurality of log files, by:
        generating, for each respective log file of the plurality of log files, based on the plurality of log records in the respective log file, a directed graph, at least some of the nodes corresponding to different user input controls, each edge connecting two nodes of the plurality of nodes and having a direction that identifies a chronological order of user interaction with the user input controls that correspond to the two nodes.

3. The method of claim 2 further comprising:
    combining the plurality of directed graphs into a combined directed graph that contains nodes and edges that correspond to the nodes and edges in the plurality of directed graphs; and
    determining, for each edge in the combined directed graph a probability value based on an occurrence of the edge in the plurality of directed graphs.

4. The method of claim 3 wherein the common path from the start user input control to the end user input control is defined by traversing the edges of the combined directed graph from a start node corresponding to the start user input control to an end node corresponding to the end user input control, and for each node that has a plurality of different edges, selecting an edge of the plurality of different edges with a highest probability value.

5. The method of claim 2 wherein each log record in a first log file of the plurality of log files identifies a user interface event, and further comprising:
    determining that a log record from a first log file identifies a different user interface event than a user interface event identified by an immediately preceding log record from the first log file; and
    generating a new node that corresponds to the different user interface event.

6. The method of claim 5 further comprising:
    determining that a plurality of successive log records in the first log file identifies a same user interface event; and
    generating a single node that corresponds to the same user interface event.

7. The method of claim 2 wherein each directed graph identifies a chronological order of user interaction with each of the different user input controls of the user interface.

8. The method of claim 1 further comprising:
    providing, to the testing process, the information that identifies the common path from the start user input control to the end user input control; and
    submitting data, by the testing process to user input controls of the user interface, in a same chronological order as identified by the common path.

9. The method of claim 8 further comprising:
    detecting an error condition while submitting the data in the same chronological order; and sending an alert that indicates the error condition was detected.

10. The method of claim 1 further comprising automatically generating a script that submits data to user input controls of the user interface in a same chronological order as identified by the common path.

11. A computing device, comprising:
a memory; and
a processor device coupled to the memory to:
access a plurality of log files generated by an application in response to user interface inputs from a corresponding plurality of users accessing a user interface of the application to accomplish a task, each log file comprising a plurality of log records that identify user interface inputs of the corresponding user to user input controls of the user interface;
analyze, for each respective log file of the plurality of log files, the plurality of log records to identify a path of a plurality of different potential paths taken by the corresponding user from a start user input control to an end user input control to accomplish the task;
store information that identifies a common path from the start user input control to the end user input control based on the path taken by the corresponding user for each log file and a common path criterion; and
after modification of the application, providing a directed graph corresponding to at least one log file of the plurality of log files to a testing process that automatically generates inputs based on the common path, the directed graph comprising a plurality of nodes and a plurality of edges.

12. The computing device of claim 11 wherein to analyze, for each respective log file of the plurality of log files, the plurality of log records to identify the path of the plurality of different potential paths taken by the corresponding user, the processor device is further to:
generate a plurality of directed graphs, each directed graph of the plurality of directed graphs corresponding to one log file of the plurality of log files, by:
generating, for each respective log file of the plurality of log files, based on the plurality of log records in the respective log file, a directed graph, at least some of the nodes corresponding to different user input controls, each edge connecting two nodes of the plurality of nodes and having a direction that identifies a chronological order of user interaction with the user input controls that correspond to the two nodes.

13. The computing device of claim 12 wherein the processor device is further to:
combine the plurality of directed graphs into a combined directed graph that contains nodes and edges that correspond to the nodes and edges in the plurality of directed graphs; and
determine, for each edge in the combined directed graph a probability value based on an occurrence of the edge in the plurality of directed graphs.

14. The computing device of claim 13 wherein the common path from the start user input control to the end user input control is defined by traversing the edges of the combined directed graph from a start node corresponding to the start user input control to an end node corresponding to the end user input control, and for each node that has a plurality of different edges, selecting an edge of the plurality of different edges with a highest probability value.

15. The computing device of claim 11 wherein the processor device is further to automatically generate a script that submits data to user input controls of the user interface in a same chronological order as identified by the common path.

16. A computer program product stored on a non-transitory computer-readable storage medium and including instructions to cause a processor device to:
access a plurality of log files generated by an application in response to user interface inputs from a corresponding plurality of users accessing a user interface of the application to accomplish a task, each log file comprising a plurality of log records that identify user interface inputs of the corresponding user to user input controls of the user interface;
analyze, for each respective log file of the plurality of log files, the plurality of log records to identify a path of a plurality of different potential paths taken by the corresponding user from a start user input control to an end user input control to accomplish the task;
store information that identifies a common path from the start user input control to the end user input control based on the path taken by the corresponding user for each log file and a common path criterion; and
after modification of the application, providing a directed graph corresponding to at least one log file of the plurality of log files to a testing process that automatically generates inputs based on the common path, the directed graph comprising a plurality of nodes and a plurality of edges.

17. The computer program product of claim 16 wherein to analyze, for each respective log file of the plurality of log files, the plurality of log records to identify the path of the plurality of different potential paths taken by the corresponding user, the instructions further cause the processor device to:
generate a plurality of directed graphs, each directed graph of the plurality of directed graphs corresponding to one log file of the plurality of log files, by:
generating, for each respective log file of the plurality of log files, based on the plurality of log records in the respective log file, a directed graph, at least some of the nodes corresponding to different user input controls, each edge connecting two nodes of the plurality of nodes and having a direction that identifies a chronological order of user interaction with the user input controls that correspond to the two nodes.

18. The computer program product of claim 17 wherein the instructions further cause the processor device to:
combine the plurality of directed graphs into a combined directed graph that contains nodes and edges that correspond to the nodes and edges in the plurality of directed graphs; and
determine, for each edge in the combined directed graph a probability value based on an occurrence of the edge in the plurality of directed graphs.

19. The computer program product of claim 18 wherein the common path from the start user input control to the end user input control is defined by traversing the edges of the combined directed graph from a start node corresponding to the start user input control to an end node corresponding to the end user input control, and for each node that has a plurality of different edges, selecting an edge of the plurality of different edges with a highest probability value.

20. The computer program product of claim 16 wherein the instructions further cause the processor device to automatically generate a script that submits data to user input controls of the user interface in a same chronological order as identified by the common path.

* * * * *